Nov. 23, 1943.  B. CASTIGLIA  2,334,991
DYNAMIC AND STATIC WHEEL BALANCER
Filed June 30, 1939  3 Sheets-Sheet 2
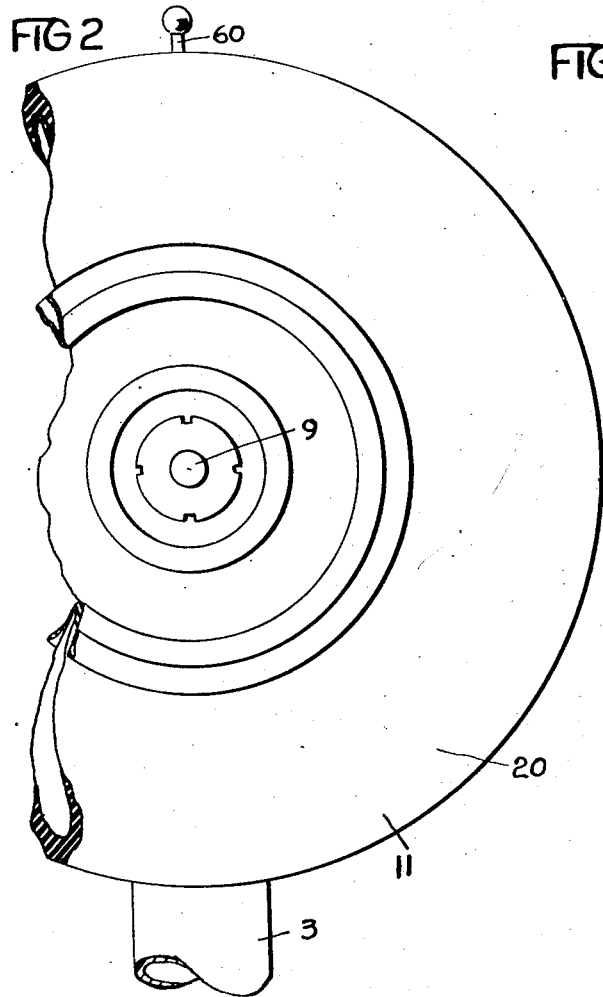
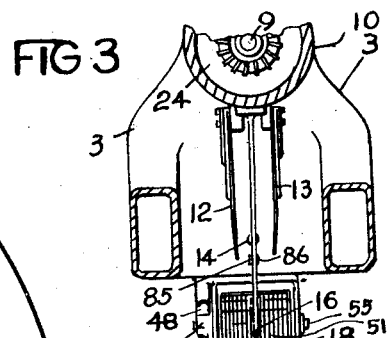
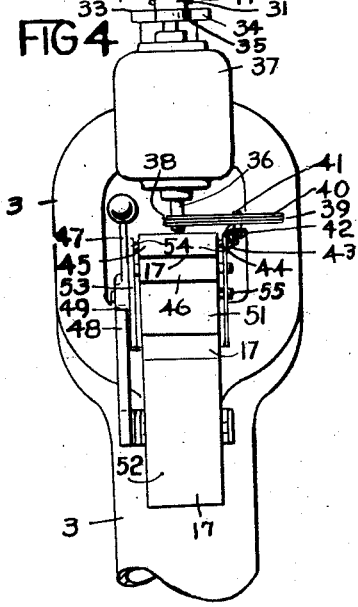
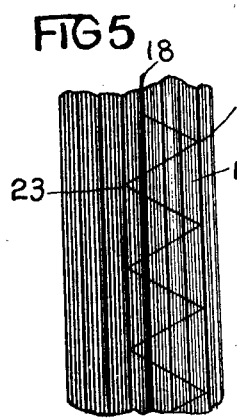
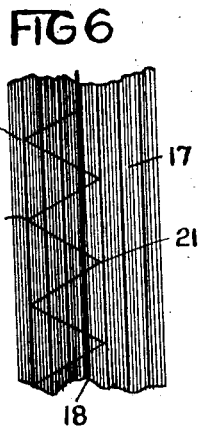
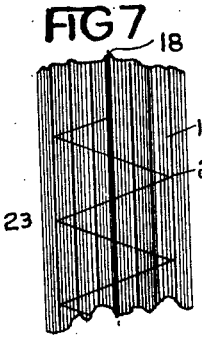
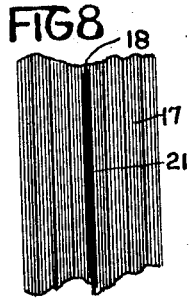
INVENTOR.
BIAGIS CASTIGLIA.
BY Paul A. Talbot.
ATTORNEY.

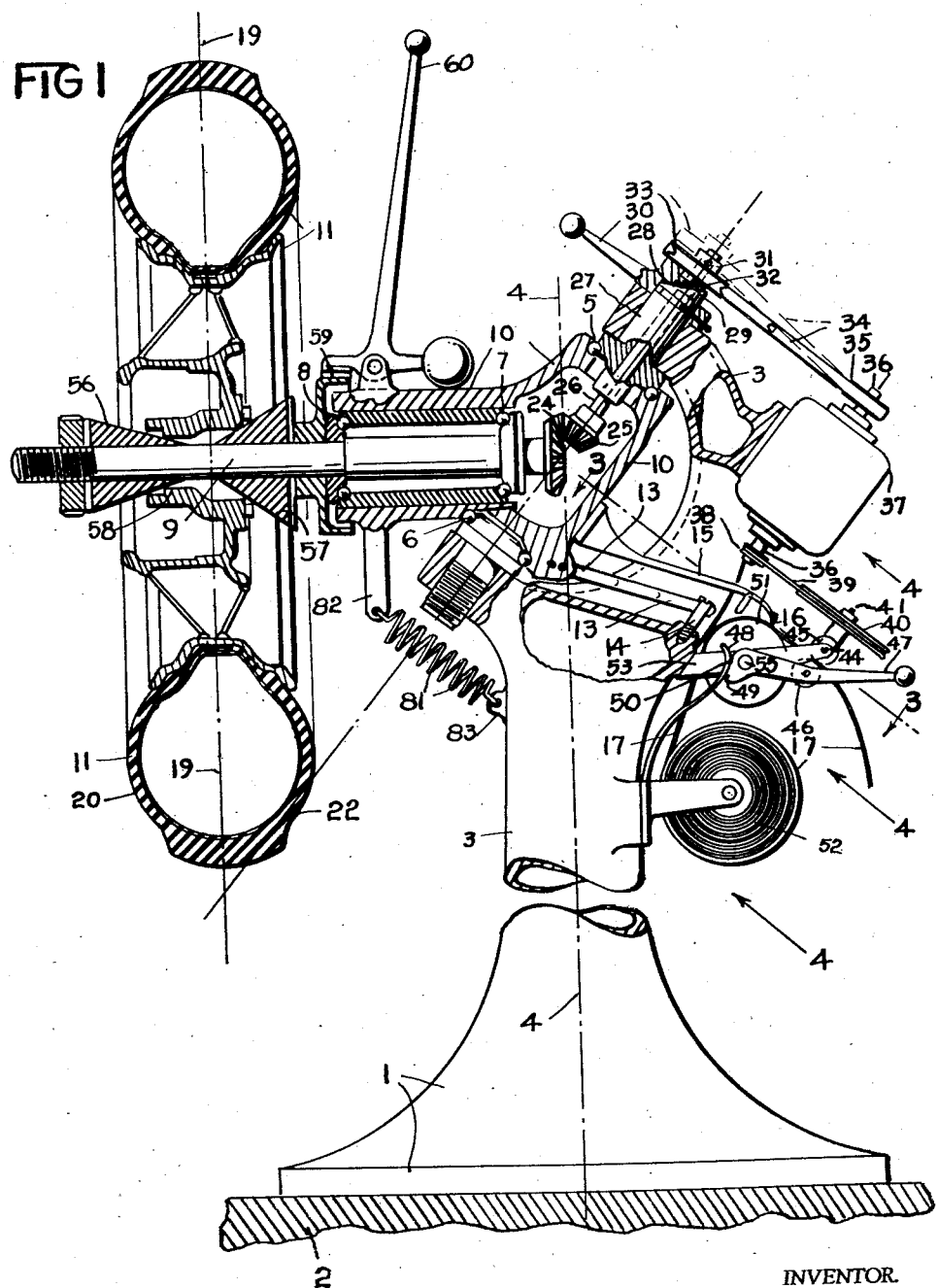

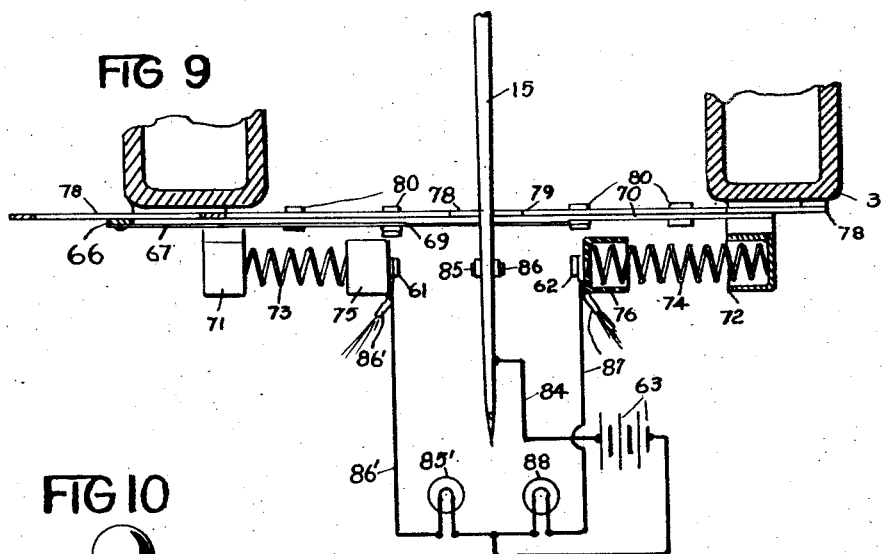

Patented Nov. 23, 1943

2,334,991

UNITED STATES PATENT OFFICE 2,334,991

DYNAMIC AND STATIC WHEEL BALANCER

Biagis Castiglia, New York, N. Y.

Application June 30, 1939, Serial No. 282,049

14 Claims. (Cl. 73—53)

My invention relates to a machine for balancing vehicle wheels and particularly to an indicating and recording machine and mechanism to detect the position of the part of the wheel and the tire where it is out of balance and has among its purposes and objects to provide:

A machine and recording mechanism which will show where and the amount the wheel is out of balance.

A machine which will show not only the position on the periphery of the wheel, but which side of the wheel is out of balance and the amount it is out of balance.

A machine which will show not only the static balance of a wheel, but which may be quickly adjusted to show the dynamic balance.

A machine which has an axis line on which the wheel axis oscillates or swings at an angle to the axis of rotation of the wheel.

A machine having an arbor revolving the wheel being balanced, which is swingingly movable at an angle in which the axial center line of the swinging connection is substantially or approximately in line with the tire or periphery of the wheel being revolved on the arbor, thereby providing a means of determining which side of the wheel is out of balance.

A means of determining the side of the rim or periphery of the wheel requiring a counter weight or adjustment to balance it as well as the circumferential position where balancing is required.

A machine for quickly and conveniently aiding in restoring substantially perfect balance for vehicle wheels.

I facilitate or accomplish these and other objects and purposes by the construction herein described and shown in the accompanying drawings forming a part hereof.

The views of the drawings are as follows:

Fig. 1 is a side elevation and partial section.

Fig. 2 is a fragmentary front elevation.

Fig. 3 is a fragmentary plan and section at 3—3 Fig. 1.

Fig. 4 is a fragmentary rear elevation at an angle to the perpendicular in the direction shown by the arrows 4—4—4 Fig. 1.

Figs. 5, 6, 7, and 8 are fragments of the recording tape.

Fig. 9 is a plan view of a modification showing an electrical indicating mechanism.

Fig. 10 is a fragmentary elevation of the modification shown in Fig. 9.

Similar reference characters refer to similar parts throughout the several views of the drawings and in the specification to follow.

I am aware that numerous devices and machines are employed to determine both the static and dynamic balance of revolving wheels, propellers, and other parts of machinery, engines, and mechanisms.

In this disclosure, I have used the term balance herein as though my machine balanced the wheel or revolving part to be balanced. This statement is, however, given in a broad sense for the sake of brevity as the machine does not balance the wheel, but due to the lack of balance of the revolving wheel, its movement is observed and by the use of my machine, the location of the spot and the amount of the unbalanced portion of the revolving part is at once determined. The wheel may then be balanced by adding weights or by "truing up" or other adjustments.

Machines for dynamic balance usually have a fundamental defect in that they are capable of determining only the radial lack of balance and thus locate somewhere on the periphery where the balance is not perfect. My invention, in addition to locating the dynamic unbalance radially, also locates on which side of the radial center line, as determined by the weight at each side of such center line, that the periphery is unbalanced, and my recording tape records the position and amount of the unbalanced spot.

In addition to determining more accurately the dynamic balance of revolving objects, my machine may be quickly placed out of gear so that the objects or wheel may freely turn to determine the unbalanced position statically. The heavy spot will cause the wheel to stop revolving with the heavy part of the periphery downmost in the usual manner.

For the purpose of clarity and simplicity, I have herein disclosed and described in detail one construction of my machine which embodies the underlying principles of my invention, illustrating to those skilled in the art to which it pertains, a complete operative machine.

After a study of this disclosure, it may be apparent that numerous modifications may be made without departing from the principles of my invention.

I have provided a relatively heavy base 1 suitable to secure to the floor or foundation 2. The base is provided with a column 3 perpendicular to the floor, having a center line 4, and at an angle of about 45 degrees thereto, I have provided the bearings 5 and 6 which support, in a relatively horizontal position, the bearings 7 and 8 in which the arbor 9 is revolvably mounted. The bearings 5 and 6 permit the head 10, arbor 9 and the wheel or object 11 to oscillate in relation to the column 3 and the wheel and arbor may, at the same time, revolve in said head which is restrained from free oscillatory movement by the springs 12 and 13 secured thereto and engaging the fixed stud 14 secured to the column 3.

Also secured to said head is the recording and indicating finger 15 having the pencil, pen, or the like 16 which records the movement of oscillation of the head on the tape 17 which may be constantly or intermittently fed as desired.

The wheel or object 11 when out of balance causes the arbor and head to oscillate as it is revolved, and in relation to a centerline 18 on the tape, will oscillate further to one side of said centerline than to the other side, depending on which side of the radial centerline 19 the heavy point may be. The side 20 or outside, if heavy at some point will cause the pen 16 to mark the tape 17 at a greater extreme travel as shown by the points 21, while if the heavy point is on the inside 22 of the periphery, the points 23 on the tape will be further from the centerline and the points 21 will be closer to the centerline of the tape.

The calibration of the springs, after being determined, designate on the tape by the height of the points of extreme oscillation, the amount of the unbalance dynamically of the wheel and the side of the high points as recorded on the tape in relation to the centerline of the tape, designate whether the heavy spot is on the inside or outside of the periphery.

The arbor 9 is revolved by the bevel gear 24 secured thereto, which meshes with the bevel pinion 25 secured to the lower end of the shaft 26 which is in axial alignment with the bearings 5 and 6 of the head 10. The shaft 26 is axially slidable as well as rotatably mounted in the sleeve 27 forming a part of the bearing 5. The upper end of said sleeve is provided with a helical cam surface 28 which engages a similar surface on the bottom of the swingingly mounted thrust plate 29 operated by the lever 30 which when moved may raise or lower said shaft 26 and thus bring the pinion 25 into or out of mesh with said gear 24.

When said pinion 25 is out of mesh with said gear 24 the arbor and wheel to be balanced, are free to be revolved by hand and thereby enable the operator to determine the static balance of the wheel in the usual manner. The heavy part of the wheel or its periphery will stop, because of gravity, at the bottom position.

The thrust plate is bored to provide an inwardly extended flange and the shaft 26 is provided with the thrust collars 31 and 32 above and below the flange of said thrust plate 29. The thrust collar 31 may also serve as a hub of the pulley 33 which receives the belt 34 from the motor pulley 35 secured to and revolved by the armature shaft 36 of the motor 37 which thus revolves the arbor and wheel 11, being balanced, at the desired revolutions.

The tape 17 may be fed in synchronism with the wheel 11 by means of the pulley 38 which is secured to said armature shaft 36 and receives the belt 39 which revolves the pulley 40 and the spindle 41 on which is secured the bevel gear 42 which meshes with the bevel gear 43 secured to and revolving the roller shaft 44 and roller 45 which contacts the tape 17 when forced against it by the swingingly mounted idler 46.

The idler 46 is preferably raised and pressed against the under surface of the tape by the lever 47 and is held in contact causing the tape to be fed by the spring 48 engaging the cam surface 49 at the hub 50 of said lever 47. When the lever is lowered the tape is not pressed or contacted with roller 45. The tape remains stationary and the lever is held in its lowered position by said cam surface and spring 48.

The tape 17 preferably runs over the writing table or idler 51 from the roll of tape 52. The table or idler is mounted in the bracket 53 secured to the arms 54 supporting the feed roller 45. The lever 47 may be pivoted on or at the same center or spindle 55 on which the idler 51 revolves.

The arbor 9 may be provided with the centering cones 56 and 57 thereby centering the wheel 11 by its finished bore 58. I have also provided a brake rim 59 and brake lever 60 to quickly stop the revolving wheel 11.

In Figs. 9 and 10 I have shown a means of electrically signaling the balance of the wheel by providing the resilient contacts 61 and 62 arranged to complete an electric circuit through the finger 15 which may provide the positive part of the circuit from the battery 63 or other source of power which has its negative connections to said contacts 61 and 62 which may be adjusted to the extreme oscillatory movement of said finger. The position of the adjustment is indicated on the scale 64 which shows the position of said contacts 61 and 62 by the pointer 65 on the adjusting lever 66 to which are secured the links 67 and 68 which are connected to the base slidable plates 69 and 70 on which the spring seats 71 and 72 are secured and adapted to support the springs 73 and 74 supporting at their free ends the insulated terminals 75 and 76 to which the negative wires are secured and connected to the contacts 61 and 62, thereby permitting the finger to travel slightly beyond its point of contact as set by said lever 66 which causes the links secured to it at each side of the center 77 on which it swings to move said contacts together or apart.

The scale 64, center 77, and base plates 69 and 70 are mounted on the frame 78 which is secured to the column 3 which is divided at its upper end to permit the finger 15 to swing as well as to add space for the motor 37. The frame 78 is preferably provided with the slots 79 to receive the studs 80 secured to said plates and the contacts yieldingly secured to the plates to be moved by the operation of said lever 66 through its links and to slide in said frame 78.

The arbor 9 and head 10 in which its bearings are mounted are restricted in their movement as stated above by the springs 12 and 13. In some cases and particularly, in the case of relatively light wheels to be balanced, the use of an additional spring 81 is desirable to assist the arbor to swing to one side or the other from its position at "dead" center. The spring 81 is secured at one end to the bracket 82 secured to or formed integral with the head 10 and so positioned in relation to the boss 83 on the column 3, to which the other end of said spring 81 is secured, that the tension pull of it is on the centerline between the ends of the spring which crosses the centerline on which the head and arbor swing. Thus, as the arbor swings, the tension of the spring 81 near the dead center aids the swinging movement of the arbor at each side of its "dead" center in overcoming the springs 12 and 13 which, near the center, exert little relative pressure on the stud 14 and increase the pressure as the arbor and head swing to the extreme positions of travel.

The spring 81 is not sufficiently strong to overcome the springs 12 and 13 at the extremes of travel as the arbor swings to one side or the other, but is strong enough to affect and overcome the springs near each side of the center.

The positive wire 84 connects the battery 63 to the finger 15 or other part of my machine and the circuit is completed when the finger moves to one side or the other, causing one of the contacts 85 or 86 secured to said finger to contact one of said contacts 61 or 62. The positive and negative connections shown may be reversed as desired to cause the positive connection to be made to complete the circuit in which the negative connection from the source of power may remain connected to the frame and pointer.

The contact 61 is connected to one signal 85' by the wire 86', and the other contact 62 is connected by the wire 87 to the signal 88.

The unbalanced condition of the wheel revolving on the arbor causes the arbor to swing to a greater distance toward one side than toward the other side of extreme travel, depending on the location of the heavy spot relative to the side of the periphery toward the column or away from it, as at the front of the wheel when facing the machine and along the wheel axis.

Referring to Fig. 1 of the drawings, the axial centerline of oscillation of the head 10 causes the arbor 9 and the wheel revolved on it to swing on an arc about the axial center line of the head. The parts of the wheel which are at a greater distance from the center line of oscillation affect the oscillation more than the parts of the wheel nearest the center line of oscillation. Thus, as the wheel revolves and the unbalanced zone is at the bottom of the wheel as it nears the center line, relatively no movement of oscillation is indicated; while the same unbalanced zone when near the top causes a maximum movement to be indicated. The movement of oscillation thus occurs but once each revolution.

When the zone, or heavy spot on the wheel is on the inside, the amount out of balance causes less movement than the same amount of unbalance would cause if on the outside of the wheel at the bottom. At the top, the relation of the unbalanced zone, inside as compared to outside of the wheel, is less and in both cases, the oscillation occurs but once each revolution of the wheel.

The inclination of the axis of oscillation, if disposed more nearly vertical, causes the unbalanced spot to approach a double movement for each revolution instead of the single oscillatory movement when the axis of oscillation is disposed to intercept a radial plane at or near the center of mass of the wheel near its periphery. The rate or amount of the difference of oscillation because of the heavy zone, outside or inside, is best determined at revolving speeds found by experiments in which the weight and size of the wheel are of importance. At very slow speeds, the wheel will oscillate twice per revolution under certain conditions, and at very high speeds, the location of the out of balance weight zone is difficult to determine with respect to inside or outside location of the face of the wheel.

The reasons causing the indicating and recording of the position of the heavy spot or zone by my machine may be numerous, or a combination of causes may be revealed by experimentation in determining the exact angle or inclination of the axis of oscillation in relation to the axis on which the wheel is revolved. Angle of approximately 45 degrees produces satisfactory results when the axial center lines cross at or near the periphery of the wheel being balanced, and also when the revolutions are at a rate which results in a single oscillation per revolution of the wheel.

When the "heavy spot" is on the outside face of the periphery of the wheel and the wheel is also out of static balance the recording tape will show the condition as illustrated in the fragment shown in Fig. 5. When the "heavy spot" is on the inside, Fig. 6 illustrates the condition. Fig. 7 shows the dynamic unbalance when the wheel is statically balanced and Fig. 8 shows the wheel is both statically and dynamically balanced, under such conditions, no oscillations appear.

The amount of the unbalanced condition may be determined by calibrating the longitudinal lines in relation to the springs.

While I have shown a tape moved in synchronism with the revolving object being balanced, other forms of record may be used. Experience has shown that best results are obtained when the object is revolved at a definite predetermined speed. Of course, the speed may be regulated equally well by other speed regulating devices, many of which are in common use for such purposes.

After a study of the disclosure herein, it will be apparent to those skilled to the art to which it pertains, that numerous modifications may be made, and that the principles underlying my invention may be equally applicable to machines having details of construction varying considerably from the details herein shown to illustrate my invention, which is set forth in the appended claims.

I claim:

1. In a wheel balancing machine, a swinging head and an arbor horizontally revolvable in said head for securing the wheel to be balanced, a base and column and bearings supporting said head and arbor for free oscillation of said head while said wheel is being rotated, said bearing being disposed at an incline or angle to the perpendicular to provide, once in each revolution of said wheel an indication of which side face of the unbalanced wheel is dynamically out of balance.

2. In a wheel balancing machine, a swinging head and an arbor horizontally revolvable in said head for securing the wheel to be balanced, a base and column and bearings supporting said head and arbor for free oscillation of said head while said wheel is being rotated, said bearings being disposed at an incline or angle to the perpendicular to provide, once in each revolution of said wheel, an indication of which side face of the unbalanced wheel is dynamically out of balance and springs positioned to determine the amount of unbalance by affecting the oscillations of said head.

3. In a wheel balancing machine, a swinging head and an arbor horizontally revolvable in said head for securing the wheel to be balanced, a base and column and bearings supporting said head and arbor for free oscillation of said head while said wheel is being rotated, said bearings being disposed at an incline or angle to the perpendicular to provide, once in each revolution of said wheel, an indication of which side face of the unbalanced wheel is dynamically out of balance and springs positioned to determine the amount of unbalance by affecting oscillations of said head, means revolving said arbor and wheel comprising a bevel gear and pinion positioned at the crossing of the axes of the movement of the head and arbor.

4. In a wheel balancing machine, a swinging head and an arbor horizontally revolvable in said head for securing the wheel to be balanced, a base and column and bearings supporting said head and arbor for free oscillation of said head while said wheel is being rotated, said bearings being disposed at an incline or angle to the perpendicular to provide, once in each revolution of said wheel, an indication of which side face of the unbalanced wheel is dynamically out of balance and springs positioned to determine the amount of unbalance by affecting oscillations of said head, means revolving said arbor and wheel comprising a bevel gear and pinion positioned at the crossing of the axes of the movement of the head and arbor, and means disengaging said gear and pinion to permit said arbor and wheel to freely revolve for determining the static balance of said wheel.

5. In a wheel balancing machine, a swinging head and an arbor horizontally revolvable in said head for securing the wheel to be balanced, a base and column and bearings supporting said head and arbor for free oscillation of said head while said wheel is being rotated, said bearings being disposed at an incline or angle to the perpendicular to provide, once in each revolution of said wheel, an indication of which side face of the unbalanced wheel is dynamically out of balance and springs positioned to determine the amount of unbalance by affecting the oscillations of said head and indicating and recording means comprising a recording surface upon which a record of the oscillations of said head is made in the form of a trace, said recording surface having a centerline the location of the heavy spot on the side face of the wheel being indicated on said recording surface by the disposition of the trace, to one side or the other of said centerline.

6. In a balancer, wheel supporting means on which the wheel to be balanced is revolvably secured, means supporting and swingingly mounting said wheel supporting means, said means swingingly mounting said wheel supporting means having its axis of oscillation at an angle inclined to the axis of rotation of said wheel, both of said axes crossing outside the periphery of said wheel and means yieldingly restraining the free oscillatory movement of said means supporting said wheel supporting means against the free movements thereof on its inclined axis.

7. In a machine for determining the static and dynamic balance of revolving objects and the position of the heavy zone, means revolving the object to be balanced and swinging supporting means permitting oscillatory movement and mounting said revolving object, said supporting means having its axis of oscillation disposed at an angle to the perpendicular from the axis of rotation of said object, said axis of oscillation being disposed to cross said axis of rotation of said object outside the periphery thereof, a finger and marking means secured to said swinging supporting means and a progressively moving record, having a centerline, marked by said marking means to show the movement of said swinging support whereby the location of said heavy zone may be determined.

8. In a machine for determining the static and dynamic balance of revolving objects, means revolving the object to be balanced and swinging supporting means permitting oscillatory movement and mounting said revolving object, said supporting means having its axis of oscillation disposed at an angle to the perpendicular from the axis of rotation of said object, said axis of oscillation being disposed to cross said axis of rotation of said object outside the periphery thereof, and means indicating the amount of oscillation about the axis of said supporting means.

9. In a machine for determining the static and dynamic balance of revolving objects, means revolving the object to be balanced and swinging supporting means permitting oscillatory movement and mounting said revolving object, said supporting means having its axis of oscillation disposed at an angle to the perpendicular from the axis of rotation of said object, said axis of oscillation being disposed to cross said axis of rotation of said object outside the periphery thereof, and means recording the amount of oscillation about the axis of said supporting means.

10. In a machine for determining the static and dynamic balance of revolving objects, means revolving the object to be balanced and swinging supporting means permitting oscillatory movement and mounting said revolving object, said supporting means having its axis of oscillation disposed at an angle to the perpendicular from the axis of rotation of said object, said axis of oscillation being disposed to cross said axis of rotation of said object outside the periphery thereof, whereby the unbalanced condition of said revolving object may be determined at one side or the other relative to the plane of symmetry of the obect perpendicular to the axis of the said object.

11. In a machine for determining the balance of revolving objects, a supporting means and a head swingingly mounted therein oscillated by the unbalanced condition of said revolving objects, said swinging head having its axis of oscillation disposed at an angle, less than a right angle to the substantially horizontal axis about which the object revolves, means rotatably mounting the object in said head and spring means permitting oscillatory movement thereof at an angle to the axis of rotation and restraining the oscillatory movement of said head.

12. In a machine for determining the balance of revolving objects, a supporting means and a head swingingly mounted therein oscillated by the unbalanced condition of said revolving objects, said swinging head having its axis of oscillation disposed at an angle, less than a right angle to the substantially horizontal axis about which the object revolves, means rotatably mounting the object in said head and spring means permitting oscillatory movement thereof at an angle to the axis of rotation and restraining the oscillatory movement of said head, said spring means increasing the resistance to movement at the extremes of travel of oscillation of said head and a second spring secured to said head decreasing resistance to movement at either side of the center of oscillation of said head.

13. In a wheel balancing machine, a swinging head, means mounted on said head for revolvably mounting the wheel to be balanced about a horizontal axis, a base and column and bearings supporting said swinging head to permit said head to oscillate therein, said bearings being disposed at an incline or angle to the perpendicular and having the axis of oscillation of the head disposed to cross the plane of symmetry of said wheel, said plane of symmetry being perpendicular to the axis of said wheel, thereby to provide, once in each revolution of said wheel, an indication of which side face of the unbalanced wheel is dynamically out of balance.

14. In a balancer, supporting means on which the wheel to be balanced is revolvably mounted, means swingingly supporting said first means on which said wheel is revolvably mounted permitting oscillation and having its axis of oscillation angularly disposed to the axis of the revolving wheel, whereby the plane of symmetry within said wheel is perpendicular to the axis of said wheel, said plane of symmetry when extended crossing the extended axis of oscillation of said swinging support.

BIAGIS CASTIGLIA.